US007575153B2

(12) United States Patent
Wisniewski et al.

(10) Patent No.: US 7,575,153 B2
(45) Date of Patent: Aug. 18, 2009

(54) TRANSPARENT CREDIT CARD PROCESSING

(75) Inventors: William Wisniewski, Omaha, NE (US); Eric Ison, Virginia Beach, VA (US); Michael Schropp, Virginia Beach, VA (US); Robert J. Tedesco, Virginia Beach, VA (US)

(73) Assignee: First Data Corporation, Greenwood Village, CO (US)

( * ) Notice: Subject to any disclaimer, the term of this patent is extended or adjusted under 35 U.S.C. 154(b) by 639 days.

(21) Appl. No.: 10/993,155

(22) Filed: Nov. 18, 2004

(65) Prior Publication Data

US 2006/0102714 A1 May 18, 2006

(51) Int. Cl.
*G06Q 40/00* (2006.01)
*G07D 11/00* (2006.01)
*G07F 19/00* (2006.01)

(52) U.S. Cl. ........................ 235/379; 235/380; 235/487

(58) Field of Classification Search ................. 235/379, 235/380, 435, 446, 451, 492, 487, 483
See application file for complete search history.

(56) References Cited

U.S. PATENT DOCUMENTS

| | | | | |
|---|---|---|---|---|
| 3,536,894 | A | 10/1970 | Travioli | |
| 4,338,025 | A * | 7/1982 | Engel | 356/71 |
| 5,689,105 | A * | 11/1997 | Mizoguchi et al. | 235/475 |
| 6,290,137 | B1 | 9/2001 | Kiekhaefer | |
| 6,296,188 | B1 | 10/2001 | Kiekhaefer | |
| 6,581,839 | B1 * | 6/2003 | Lasch et al. | 235/487 |
| 2001/0055422 | A1 * | 12/2001 | Roustaei | 382/181 |
| 2003/0017312 | A1 * | 1/2003 | Labrousse et al. | 428/195 |
| 2003/0047615 | A1 * | 3/2003 | Batoha | 235/491 |

* cited by examiner

*Primary Examiner*—Edwyn Labaze
(74) *Attorney, Agent, or Firm*—Townsend and Townsend and Crew LLP

(57) ABSTRACT

The invention relates to detecting transparent and/or translucent cards. In one embodiment, a method for detecting a transparent and/or translucent card includes using a light emitter and a light detector. In aspects of the invention, the information concerning detection of the transparent and or translucent card is received at a microprocessor that enables the fabrication or the processing of the transparent and/or translucent card.

37 Claims, 6 Drawing Sheets

TRANSPARENT CREDIT CARD PROCESSING

BACKGROUND OF THE INVENTION

The present invention is directed generally to card detecting systems, and more specifically, to systems and methods for detecting opaque, transparent or translucent cards.

In current card fabrication and processing systems, cards—such as automated teller machine ("ATM") cards, debit cards, credit cards and the like—are detected when the card passes between a light emitter and a light detector. Generally, for card detecting purposes, the light emitter emits and the light detector detects infrared radiation. As the card travels between the emitter and the detector it blocks the light falling on the detector and, as a result, its presence is detected. Detection of the presence of a card during fabrication and processing is necessary for many different reasons. In the fabrication of cards, it is necessary to detect a card so that, among other things, the card can be accurately encoded and embossed. Additionally, during the card fabrication process, cards must be detected in order to track the cards progression through the assembly line and count the number of cards that nave been produced. In addition to the fabrication process, card detection is also necessary in ATMs and other processing equipment in order to detect and position cards for processing.

Recently, many card issuers have shown interest in and have started to produce cards that are transparent or translucent to the human eye. Card issuers are interested in providing transparent or translucent cards to customers because such cards are relatively unique in the marketplace, may impart status to the cardholder, and/or may be more pleasing to the eye. Additionally, features that cannot be added to opaque cards can be incorporated in transparent or translucent cards, including magnifying lenses, optical patterns, and effects, embedded designs, and security features, such as embedded holograms.

Unfortunately, the current light emission and detection methods used in card processing and fabrication systems are very often unable to detect transparent or translucent cards because such cards do not fully block infrared radiation. Therefore, transparent or translucent cards cannot be accurately fabricated or processed by systems using conventional light-blocking detection means. To overcome this problem, card issuers have added features to the transparent or translucent cards, such as putting infrared blocking coatings on the cards, incorporating lensing effects into the cards, or leaving certain areas of the transparent or translucent cards opaque. However, these attempts to alter the features of the transparent or translucent cards increase the cost of card production, reduce the advantages of such cards and do not fully address the detection problem. For example, the addition of a card coating is expensive and the coating may eventually wear off resulting in the card having an uncertain operable lifespan. In addition, by creating opaque areas on the cards, the issuer loses some of the distinctiveness of the card and the positioning of the areas of the cards may not accurately cater to the many different detector placements used in different fabricating and processing systems. Consequently, there exists a need in the art for methods and systems for detecting transparent or translucent cards.

BRIEF SUMMARY OF THE INVENTION

The present invention relates generally to systems for accurately detecting credit cards, ATM cards, and the like. More specifically, to address the need in the art, the present invention is directed to systems and methods for detecting transparent or translucent cards for processing or fabrication purposes.

The present invention disclosed and claimed herein comprises, in one aspect thereof, a light emitting source and a light detector that is positioned to detect light from the emitting source that is reflected from an object placed in a target region located in front of the light emitting source. In one embodiment of the present invention, the light emitting source is a light emitting diode ("LED"), and the light detector is a phototransistor. In another embodiment, the light emitter is an infrared emitting diode ("IRED") and the light detector is a phototransistor that is sensitive to infrared radiation.

In an embodiment of the present invention, the light emitter is positioned so as to illuminate a detection area. In one aspect, the light detector is located on the same plane as the light emitter and the light emitter and the light detector are so placed that when a transparent or translucent card is placed in the detection area with its planar surface parallel to the light emitter and the light detector, light emitted by the LED is reflected from the transparent or translucent card's planar surface and falls onto the active face of the light detector resulting in the detection of the transparent or translucent card. In one particular aspect, the system further includes a convergent reflective design, wherein the output from the emitter is converged onto the detection area so that only objects within a certain distance of the convergence point are detected. In other aspects, an average baseline of light detected by the light detector during normal working conditions is determined and the light detector is set to register only light falling on the light detector that exceeds this baseline by a certain factor. In this way, false detection of objects may be prevented.

In an embodiment of the present invention, the light emitter and light detector are positioned so as to be appurtenant to each other, but parallel to the surface of a transparent card placed in the detection. In this embodiment, the light emitter and the light detector are placed at an optimal proximity to the translucent or transparent card such that the reflected light is above a threshold detection level. In such a configuration, light emitted by the light emitter strikes the planar surface of the transparent or translucent card in the detection area, is reflected, and is then detected by the light detector.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

DETAILED DESCRIPTION OF THE INVENTION

The present invention provides a system and a method for accurately detecting transparent cards. Detection of the transparent cards is achieved using light emitters and light detectors. In particular, the system and method for detecting transparent cards is used in card fabrication and card processing.

In the figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

During card fabrication, cards must be detected on the assembly line so that they can be accurately embossed and/or have a magnetic stripe attached. Detection is also necessary so that the fabricated cards can be attached to a card carrier and/or inserted into an envelope for mailing to customers. Further, card detection is necessary so that the cards can be tracked on the assembly line and an accurate number of the cards produced can be recorded in order to count the number of cards produced during a predetermined time interval.

Figure 1:
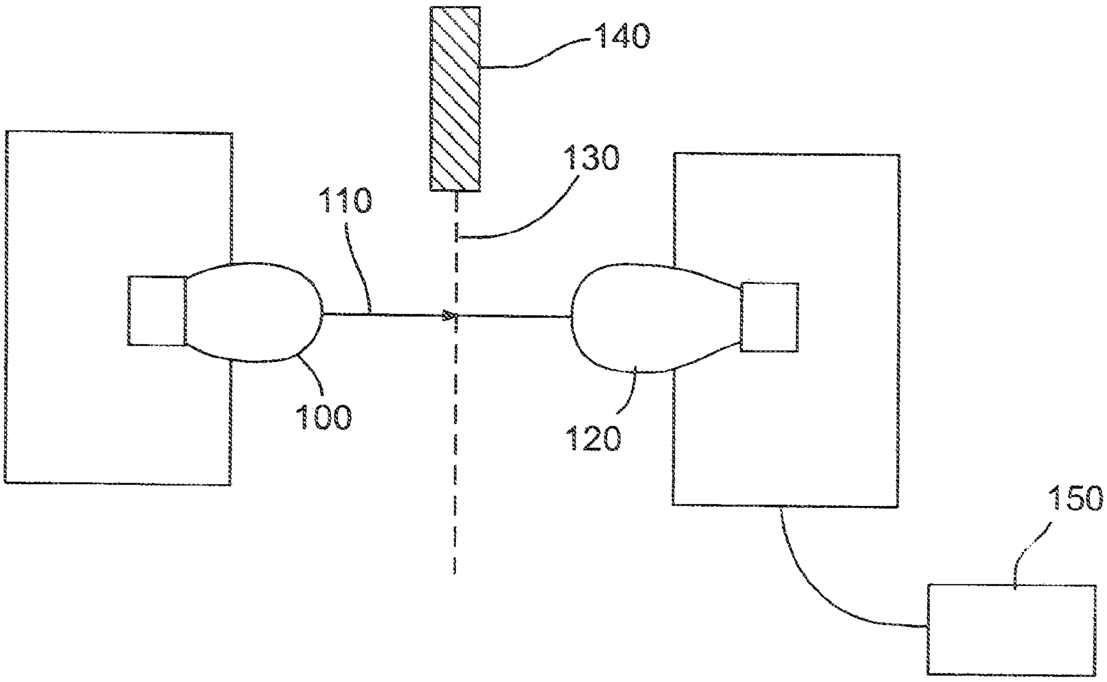
Fig. 1 PRIOR ART
FIG. 1 shows a prior art arrangement for the sake of comparison.

On typical card fabrication assembly lines, cards are detected based upon the fact that the opaque card surface of the card will block an LED light beam incident upon it. For comparative purposes, FIG. 1 illustrates a typical through beam sensor used for card detection. For purposes of this application and as is generally understood in the art, the term sensor is used to describe a light emitter-light detector pair. In the through beam sensor of FIG. 1, a light emitter 100 emits a light beam 110. The emitter may be an LED, IRED or other type of device designed to emit electromagnetic radiation. The light beam produced by the light emitter 100 falls upon and is detected by a light detector 120. The light detector 120 maybe a phototransistor or other type of photosensitive device designed to detect electromagnetic radiation. In the through beam sensor, light detector 120 is located opposite the light emitter 100 and there is a detection area 130 situated between the light emitter 100 and the light detector 120.

According to the configuration of FIG. 1, when an opaque card 140 is positioned in the detection area 130, the opaque card 140 prevents the output of the light emitter 100 from falling on the light detector 120. When light from the light emitter 100 is blocked from the light detector 120, the electrical characteristics of the light detector 120 change and this change in electrical characteristics of the light detector 120 is registered by a microprocessor 150 connected to the light detector 120. Consequently, the presence of the opaque card 140 is detected by the through beam sensor. Further, by using multiple light emitter 100-light detector 120 pairs, the position of the opaque card 140 can be tracked, the number of opaque cards 140 on the assembly line can be counted, or the exact location of the opaque card 140 can be identified. Alternatively, the through beam sensor of FIG. 1 can be used to detect the insertion of the opaque card 140 into an ATM or other card processing system.

A typical light emitter in a card assembly line or an ATM is an IRED source having a wavelength in the range of about 820-920 nm or 900-1000 nm. Infrared radiation in this wavelength range is used in the sensors because such wavelengths do not occur in sufficient levels in ambient light to affect the characteristics of the light detector; and therefore, there is no concern that ambient light will affect the light detector and possibly cause false detections. A typical light detector used in a conventional, opaque card detection device is sensitive to wavelengths in the range of about 400 nm-1100 nm. As persons skilled in the art are aware, the visible spectrum wavelength range is about 400 nm-700 nm. In a typical card detection device, the phototransistor has a spectral sensitivity of about 60-90% to infrared radiation with wavelengths between 800-1000 nm. As such, ambient, visible light does not affect the light detector used in a typical card detection device.

As shown in FIG. 1, when the opaque card 140 passes between the light emitter 100 and the light detector 120 it blocks the light radiation produced by the light emitter 100 from being detected by the light detector 120. Generally, in card detection systems the light emitter 100 is an IRED and blocking of the infrared radiation it produces is ensured by International Organization for Standardization standards, which require, for ATM purposes, that all machine readable cards must have an optical transmission density that prevents more than 95% transmission of wavelengths from 450 nm-950 nm and more than 93% of wavelengths between 950 nm-1000 nm. Because the opaque card 140 has such optical transmission densities, when the opaque card 140 is interposed in the detection area 130 and the light detector 120 is a phototransistor, the voltage across the light detector 120 will drop indicating the presence of the opaque card 140 in the detection area 130.

Figure 2:
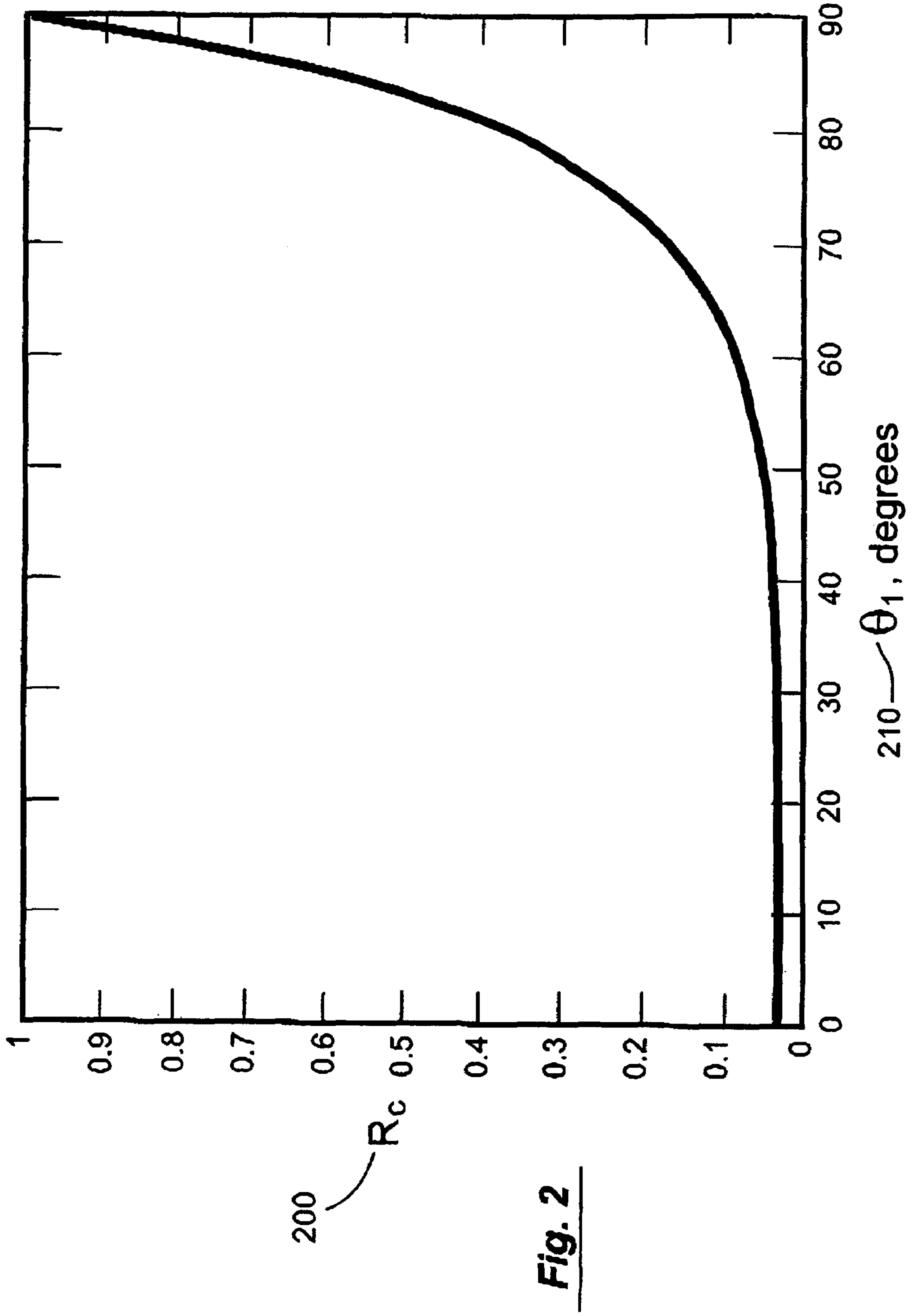
FIG. 2 illustrates the change in reflection coefficient with angle of incidence for a transparent object.

FIG. 2 illustrates the change in the reflection coefficient 200 as a function of the angle of incidence 210 for unpolarized light incident on a transparent substance, such as glass. In general, neglecting absorption characteristics, wavelengths outside of the visible spectrum, i.e., infrared and ultraviolet radiation, will exhibit similar properties to those of the unpolarized light shown in FIG. 2. As illustrated in FIG. 2, when a translucent or transparent card passes between a light emitter 100 and a light detector 120, it may not be detected because, with the Angle of Incidence 210 approximating zero degrees, virtually none of the infrared radiation will be blocked by the transparent or translucent card and, consequently, the electronic characteristics of the light detector will not change significantly and the transparent or translucent card will not be detected.

The following table shows the refractive indexes of different materials.

| | |
|---|---|
| Acrylics | 1.49 |
| Cellulose Nitrate | 1.49-1.51 |
| Polypropylene (Unmodified) | 1.49 |
| Polyallomer | 1.492 |
| Polybutylene | 1.50 |
| Ionomers | 1.51 |
| Polyethylene (Low Density) | 1.51 |
| Nylons (PA) Type II | 1.52 |
| Acrylics Multipolymer | 1.52 |
| Polyethylene (Medium Density) | 1.52 |
| Styrene Butadiene Thermoplastic | 1.52-1.55 |
| PVC (Rigid) | 1.52-1.55 |

As persons familiar with the art are aware, cards are most commonly manufactured from PVC. As such, transparent or translucent cards will exhibit essentially the same reflective properties as glass.

To address the inability of traditional through-beam sensor methods to detect transparent/translucent cards, card manufacturers have produced cards with opaque areas, with infrared directional capabilities, or with films that selectively block infrared radiation. However, in card fabrication systems and ATMs there is no standardization regarding the positioning of light emitter-light detector pairs. For this reason, it cannot be guaranteed that transparent or translucent cards containing opaque areas will be detected by a conventional detection system. Additionally, techniques, such as adding films to the transparent cards or fabricating the transparent card to form a lens to redirect the light from a light emitter are costly and may not provide a long-term solution because of the likelihood that the films and the lenses may not have longevity or may not even survive the fabrication process.

Figure 3:
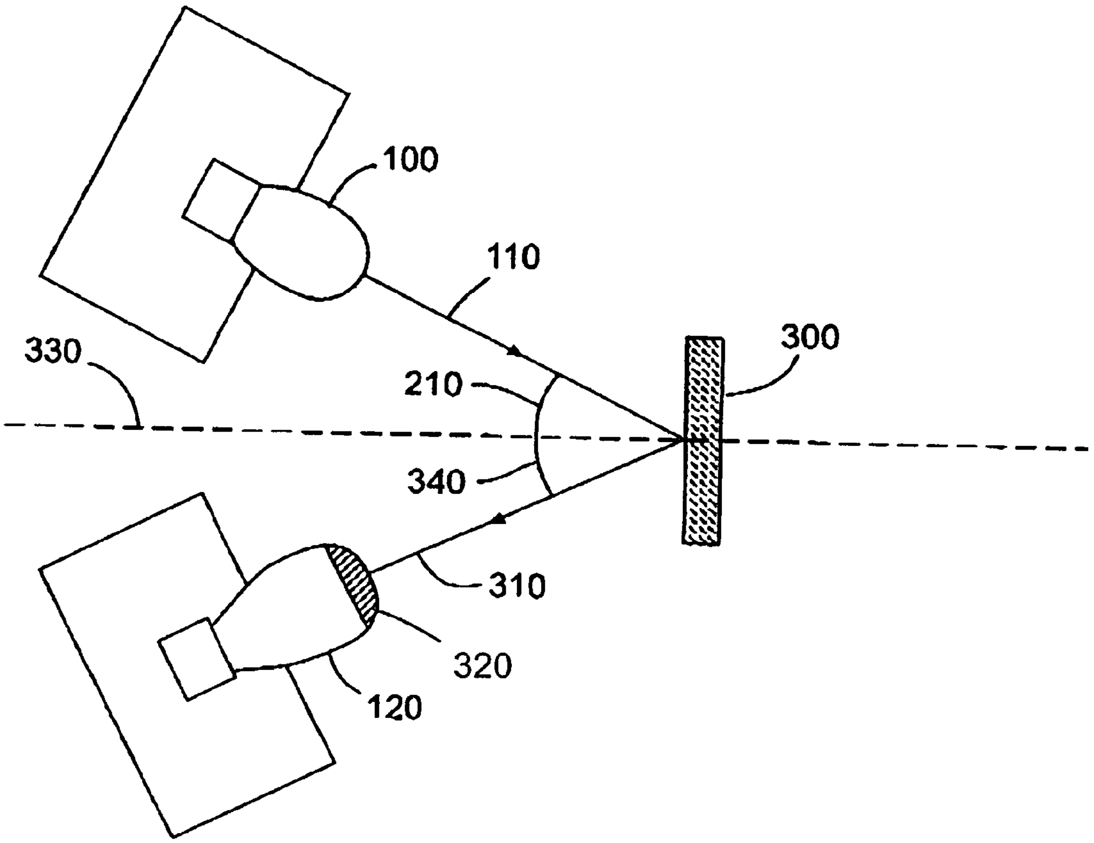
FIG. 3 illustrates a transparent/translucent card detector embodying the present invention.

FIG. 3 illustrates an embodiment of the present invention. In this embodiment, a light emitter 100 emits a light beam 110 that is directed upon a transparent card 300. The light beam 110 is reflected as reflected light beam 310 that is detected by light detector 120 when it falls upon the active face 320 of light detector 120. As shown in FIG. 2, as the angle of incidence 210 is increased with respect to the normal 330 the relative strength of the reflected light beam 310 increases. In an aspect of the present invention, the light emitter 100 is positioned so that the light beam 110 falls upon the transparent card 300 with an angle of incidence 210 greater than 45° and the light detector 120 is angled relative to the transparent card 300 so that the reflected light beam 310 falls upon the active face 320 of the light detector 120, wherein the positioning of the light detector 120 is made knowing that the angle of reflection 340 is equal to the angle of incidence 210. In this aspect of the present invention, detection of the transparent card 300 occurs because of the relatively high reflectivity of the transparent card 300 at large angles of incidence 210.

Figure 4A:
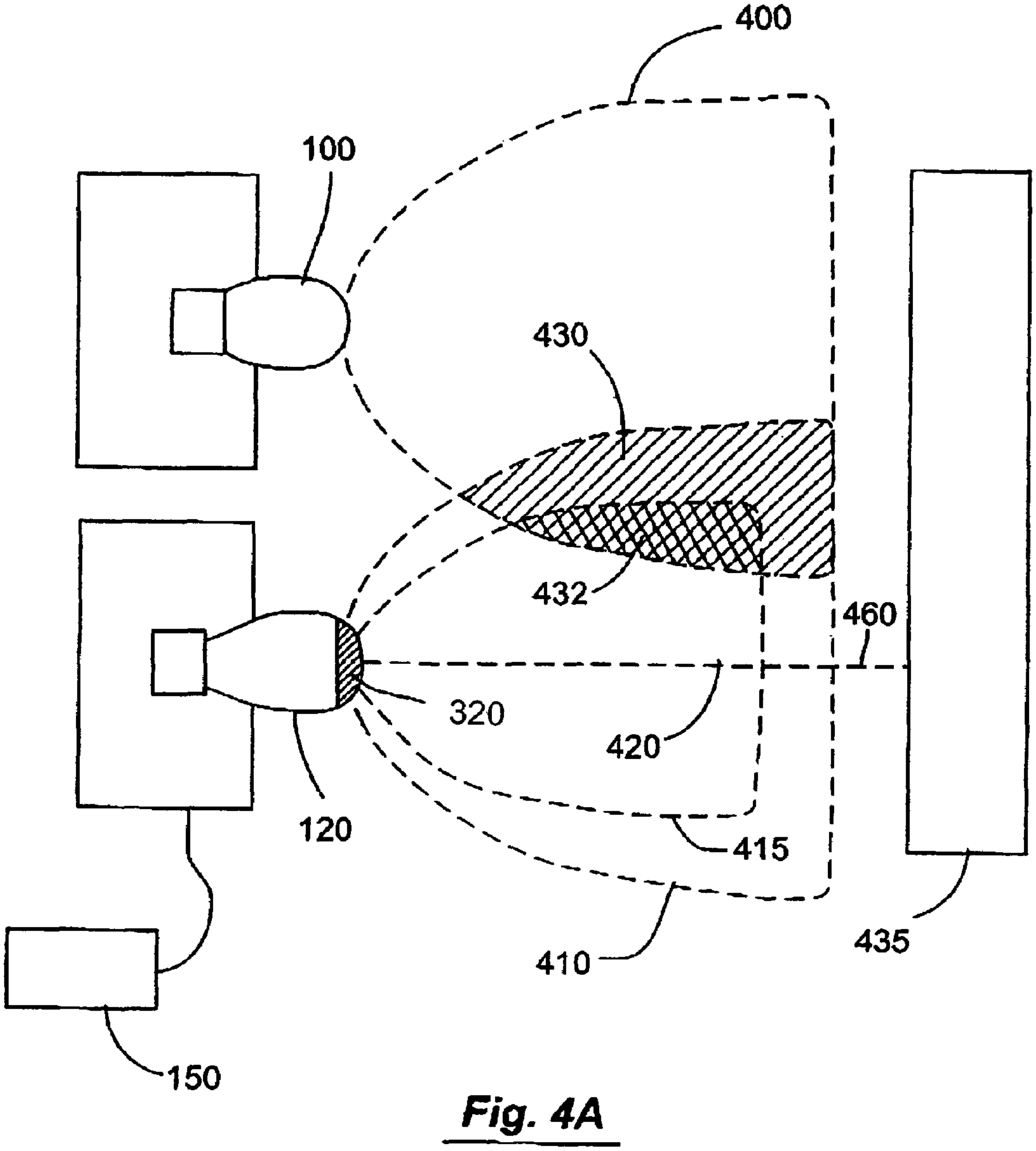
FIG. 4A illustrates a transparent/translucent card detector embodying the present invention when no transparent/translucent card is present.

FIG. 4A depicts a simplified schematic of a transparent card detection system according to an alternative embodiment of the present invention in which the light emitter 100 and the light detector 120 are position parallel and in close proximity to one another. According to the embodiment of the present invention shown in FIG. 4A, the light emitter 100 produces an emitted beam pattern 400. The emitted beam pattern 400 discloses the diameter of the emitted beam as a function of distance from the light emitter 100. In an aspect of the present invention, the light beam 110 is collimated. In another aspect of the present invention, the light beam 110 is convergent; that is, it is emitted at an angle to the light emitter. In either aspect, there exists a distance beyond which an object will not be detected because of the low intensity of the light beam 110 at this distance.

FIG. 4A illustrates a reflected beam pattern 410. The reflected beam pattern 410 shows how far the middle of a white card may be displaced from the optical axis 420 of the light detector 120 and still be detected. The detection area 430 occurs where the emitted beam pattern 400 and the reflected beam pattern 410 overlap and illustrates an area where the center of the white card will be detected. Additionally, a reflected beam pattern 415 is also shown that illustrates how far the middle of the transparent card 300 may be displaced from the optical axis 420 of the light detector 120 and still be detected. The transparent card detection area 432 occurs where the emitted beam pattern 400 and the reflected beam pattern 415 overlap and illustrates the area in which the center of the transparent card 300 will be detected in the embodiment of the present invention shown in FIG. 4A.

In the embodiment of the present invention described in FIG. 4A, the light detector 120 is positioned appurtenant to the light emitter 100. In an aspect of the present invention, the light emitter 100 and the light detector 120 are approximately 3 or 4 mm apart. In an aspect of the present invention, the light detector 120 may be any device capable of sensing changes in the amount of radiation—light waves, ultraviolet or infrared radiation—falling upon the active face 320 of the light detector 120 where the active face 320 is of the order of 10 mm square. In an embodiment of the present invention, the light detector 120 is a phototransistor. In alternative embodiments, the light detector 120 is a photoresistor or a photodiode. In a particular embodiment, the light detector 120 is connected to a micro processor 150 that processes the information generated by the light detector 120 when different amounts of radiation fall upon the active face 320 of the light detector 120.

The use of the light emitter 100 in close proximity to and parallel with the light detector 120 to detect objects placed in front of the light emitter 100-light detector 120 pair is known in the art. Such sensors are known as diffuse-reflective sensors and detect objects placed in front of the sensors due to the diffuse reflection of the radiation emitted by the light emitter 100 from the object that is placed in front of the light emitter 100. Various different sensor companies manufacture diffuse-reflective sensors including SunX Sensors USA, 1207 Maple, West Des Moines, Iowa 50265.

In an aspect of the present invention, fabricating or processing equipment 435 is positioned behind the target area 130. Most commonly, the fabricating or processing equipment 435 is equipment that is necessary to move/position the transparent card 300 during processing or fabrication.

Figure 4B:
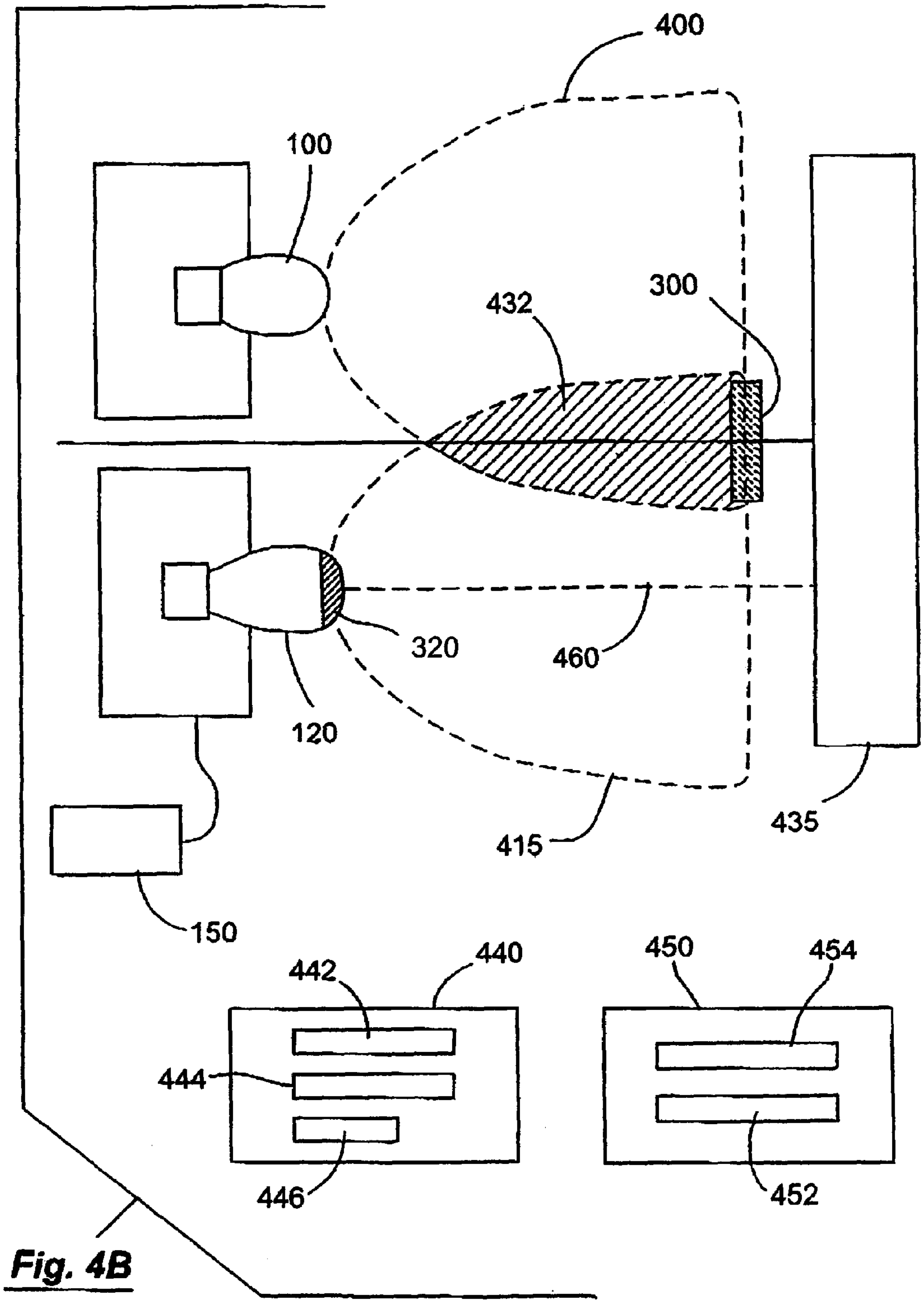
FIG. 4B illustrates a transparent/translucent card detector embodying the present invention when a transparent/translucent card is present.

FIG. 4B depicts a simplified schematic of a card detection system according to an embodiment of the present invention in which the transparent card 300 is present in the transparent card detection area 432. The transparent card 300 may be a credit card, a bankcard, an ATM card, telephone card, gift card, stored value card, or any other kind of transaction-based card that is transparent or translucent. The transparent card 300 has a first or front planar face 440 and a second or back planar face 450. Front planar face 440 of the transparent card 300 may include a bank name 442, an account number 444, and a customer name 446, among other things. The back planar face 450 may include a signature block 452 and a magnetic stripe 454, among other things. For, among other reasons, aesthetic reasons and/or security reasons, manufacturers of transparent cards may not include a magnetic stripe on the transparent card 300.

In the embodiment of the present invention depicted in FIG. 4B, either the front planar face 440 or the back planar face 450 of the transparent card 300 is positioned in the transparent card detection area 432 so that one of the planar faces of the transparent card 300 is approximately perpendicular to the normal line 460. As depicted in FIG. 4B, the transparent card 300 is within the transparent card detection area 432. As such, the emitted beam pattern 400 from the light emitter 100 is incident upon the transparent card 300 and at least partially reflected from transparent card 300 onto the active face 320 of the light detector 120. In certain embodiments, the light emitter 100 is an IRED and the emitted beam pattern 400 comprises infrared radiation. As persons of skill in the art are aware, the magnitude of the reflected beam pattern 432 will be significantly less from the transparent card 300 than from the opaque card 140. However, as illustrated in FIG. 2, even the transparent card 300 is capable of reflecting a portion of the emitted beam pattern 400. In an embodiment of the present invention, the light emitter 100 and the light detector 120 are positioned in close proximity to the transparent card 300 and the reflected beam pattern 432 is sensed by the light detector 120 causing changes in electronic properties of the light detector 120 that are detected by the microprocessor 150.

As discussed above, in certain embodiments, the light emitter 100 is an IRED. Accordingly, in such embodiments where the light detector 120 is matched to the IRED, for example, the light detector 120 may be a silicon phototransistor with a window filter that transmits infrared radiation, but blocks ambient light. Such sensors are well known in the art and are manufactured by such companies as Honeywell, among others. In embodiments of the present invention as depicted in FIG. 4B, where the light emitter 100 is an IED and the light detector 120 is matched to the IRED, the microprocessor 150 is adjusted to ignore any ambient infrared radiation or reflected or scattered infrared radiation detected by the light detector 120. This removal of false detection of the transparent card 300 is achieved by setting a threshold detection value to take account of an average background noise value. Accordingly, when the transparent card 300 enters the transparent card detection area 432, it reflects infrared radiation increasing the amount of such radiation incident upon the active face 320 of the light detector 120, and this increase changes the electrical properties of the light detector 120 resulting in the detection of the transparent card 300 by the microprocessor 150. In certain embodiments, the microprocessor 150 may relay the detection of the transparent card 300 to other systems, such as embossing or processing systems, so that these systems become aware of the presence of the transparent card 300 in the transparent card detection area 432 and may act accordingly. Such actions may include instructing fabrication machinery that the card is positioned for fabrication. In different embodiments, transparent card 300 may pass through the transparent card detection area 432 and the microprocessor 150 may simply record that the transparent card 300 was detected so that an accurate count of cards passing through the transparent card detection area 432 is compiled.

In an embodiment of the present invention for detecting the transparent card 300, a SunX PM2-LF10 diffuse-reflective sensor is used to detect the transparent card 300. The SunX PM2-LF10 contains a light emitter 100 that emits infrared radiation at a wavelength of 880 nanometers and a light detector 120 designed to detect such wavelengths. The SunX PM2-LF10 is a convergent reflective sensor. Convergent reflective sensors emit a convergent beam pattern 400 that is aimed to a specific distance range in front of the sensor. Accordingly, objects that are either too far in front or too far behind the convergent distance range of the sensor will not reflect enough incident radiation to be detected by the sensor. As persons skilled in the art are aware, a sensor may falsely register the detection of a transparent card 300 because the transparent card 300 has a very low reflectivity and fabricating or processing equipment 435 operating in proximity to the sensor may reflect enough of the light emitted by the light emitter 100 to cause a false detection. Because of these issues, in an embodiment of the present invention, the SunX PM2-LF 10 diffuse-reflective sensor is positioned at a distance from the fabricating or processing equipment 435 such that the fabricating or processing equipment 435 is far enough beyond the convergent distance of the convergent beam produced by the sensor to prevent false detection of the fabricating or processing equipment 435. In an embodiment of the present invention, the SunX PM2-LF10 convergent reflective sensor is positioned approximately 4-6 mm from the transparent card detection area 432. In such an embodiment, because of the properties of the SunX PM2-LF10 convergent reflective sensor, the transparent card 300 may be detected at distances between, approximately, 3-8 mm from the SunX convergent reflective sensor. In an aspect of the present invention, the SunX convergent reflective sensor is positioned so that it is greater than approximately 10 mm away from the fabricating or processing equipment 435 to prevent false detections.

Figure 5:
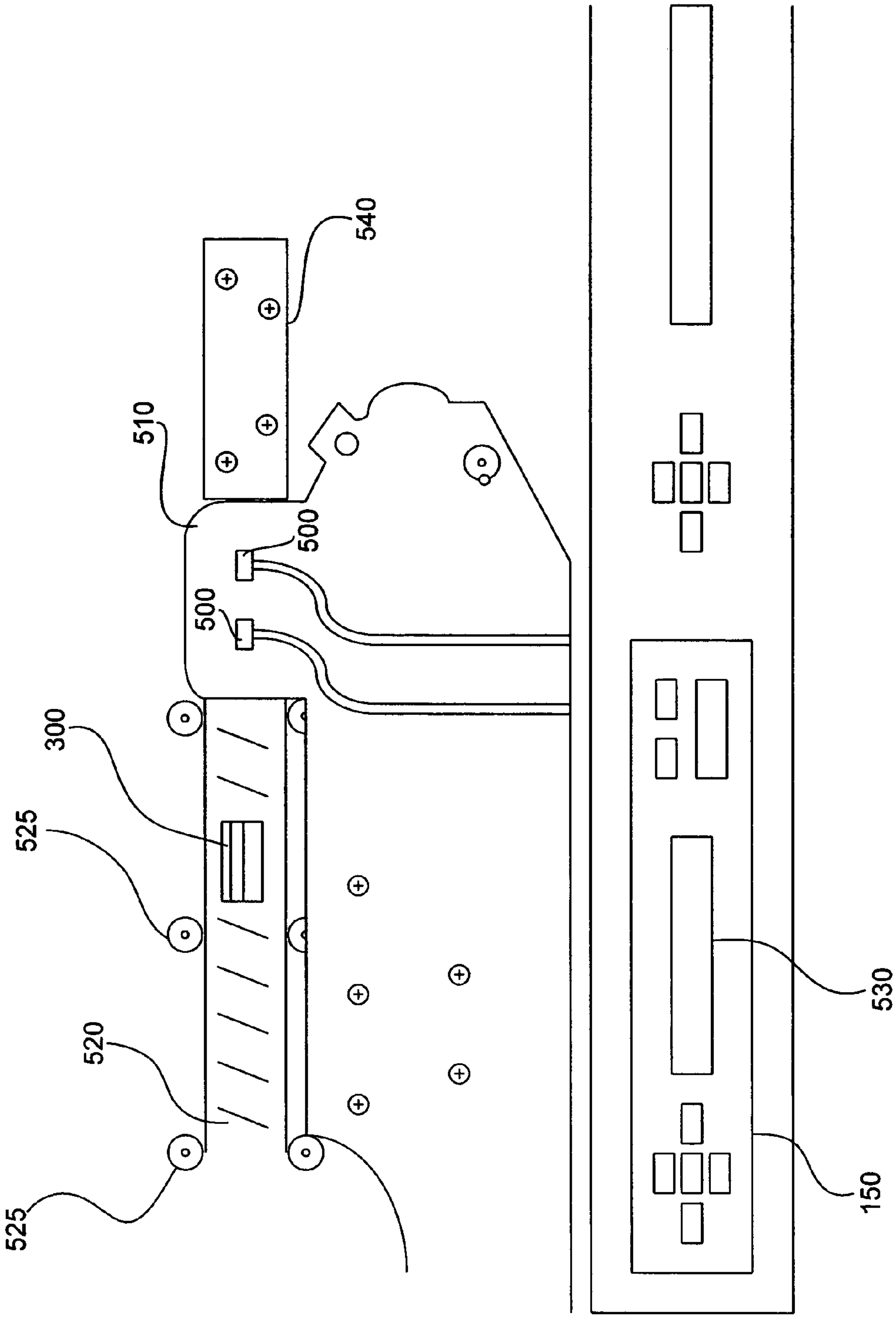
FIG. 5 illustrates a portion of a card fabricating/processing system incorporating an embodiment of the present invention.

FIG. 5 illustrates a portion of a card fabricating/processing system incorporating an embodiment of the present invention. In the illustrated embodiment, sensors 500 are installed on a positioning assembly 510. Each of the sensors 500 comprises a light emitter and a light detector. In one aspect of the invention, each of the sensors 500 is a SunX PM2-LF10 convergent reflective sensor. In the illustrated embodiment, the sensors 500 are electronically connected to the microprocessor 150. In an aspect of the present invention, the microprocessor 150 contains a display 530 that is capable of displaying information. In one embodiment, the positioning assembly 510 holds the sensors 500 at a predefined distance from a conveyor belt 520 that is moved by means of rollers 525. In an aspect of the present invention the sensors are SunX PM2-LF10 convergent reflective sensors and the positioning assembly holds the sensors 500 at a distance of about 5 mm from the surface of the conveyor belt 520.

In the fabricating/processing embodiment of the present invention illustrated in FIG. 5, the transparent card 300 is on the conveyor belt 520. In an embodiment of the present invention, during fabrication/processing the transparent card 300 is conveyed by the conveyor belt 520 into the detection areas in front of the sensors 500 and the transparent card 300 is detected. To increase the detection ability of the sensors 500, the conveyor belt 520 may be comprised of a black, rough surface to reduce reflection properties of the conveyor belt 520. Additionally, normalization of the signal received from the sensors 500 by the microprocessor 150 may be performed. In an alternative embodiment, the transparent card 500 may be moved solely by means of a roller system to remove the proximity of a reflecting surface from the sensors 500.

In one aspect of the present invention, based upon the detection of transparent card 300 by the sensors 500 and the processing of the detection information by the microprocessor 150, the fabricating/processing equipment 540 fabricates/processes the transparent card 300. In one aspect, fabricating/processing equipment 540 embosses the card. Embossment may include the raising of a card number on the transparent card. In another aspect, the fabricating/processing equipment 540 causes a magnetic stripe to be applied to the card. For, among other reasons, aesthetic reasons and/or security reasons, manufacturers of transparent cards may not include a magnetic stripe on the transparent card 300. Accordingly, in a further aspect of the present invention, the fabricating/processing equipment 540 may cause stored information, other than a magnetic stripe, to be applied to the transparent card 300, wherein said stored information may include a processor, storage device, or the like. Detection of the card by the sensors 500 may also be recorded by the microprocessor 150 and displayed on the display 530 to provide a count of transparent cards 300 detected by the sensors 500.

In a further aspect of the invention, the fabricating/processing equipment 540 may read the detected transparent card 300. Reading may involve the process of receiving and interpreting information stored on a magnetic stripe on the transparent card 300. Reading may also involve reading a hologram or communicating with a processor, storage device or the like incorporated into the transparent card 300. Embodiments may include positioning apparatus to position the detected transparent card 300 for fabricating/processing. In further embodiments, after detection of the transparent card 300 fabricating/processing equipment 540 matches the card to a card carrier or an insert so that the card may be mailed to the relevant card customer. In one aspect, the fabricating/processing equipment 540 attaches the card to the card carrier or insert. In another aspect, the fabricating/processing equipment 540 inserts the card and card carrier or insert into an envelope.

In an embodiment of the present invention, the sensors 500 are utilized in an ATM machine to detect the transparent card 300. In an aspect of such an embodiment, after detection of the transparent card 300, the processing equipment in the ATM may process the transparent card 300. Processing may involve reading the magnetic stripe on the transparent card 300. Alternatively, processing may involve the retrieval of information stored on the transparent card by means other than a magnetic stripe, such as a processor, storage medium, hologram or the like. In another aspect of the present invention, after detection and location of the transparent card 300 is observed, positioning equipment in the ATM may position the detected transparent card 300 for accurate processing.

In light of the above description, a number of advantages of the present invention are readily apparent. For example, the method and system for detecting transparent cards may be added to existing fabrication and processing equipment to provide for the fabrication and processing of transparent cards without the need to add special films to the transparent cards or to add opaque regions to the transparent cards. Additionally, the method and system for detecting transparent cards of the present invention may be easily installed on existing fabricating and processing systems and is therefore cost effective in comparison to the customizing of the transparent cards currently being used as means to provide for the detection of transparent cards.

A number of variations and modifications of the invention can also be used. And, although the invention is described with reference to specific embodiments thereof, the embodiments are merely illustrative, and not limiting of the invention, the scope of which is to be determined solely by the appended claims.

What is claimed is:

1. A method for detecting a transparent card, comprising:
- providing a reflectance sensor;
- providing a transparent card;
- using the reflectance sensor to detect the transparent card; and
- receiving detection information from the reflectance sensor at a microprocessor;
- wherein the microprocessor uses the detection information to enable processing of the transparent card, and wherein the processing of the transparent card comprises associating the transparent card with an insert and inserting the transparent card and insert into an envelope.

2. The method for detecting the transparent card as recited in claim 1, wherein the reflectance sensor comprises an emitter for emitting a light beam and a detector for detecting a portion of the light beam reflected by the transparent card.

3. The method for detecting the transparent card as recited in claim 1, wherein the microprocessor is associated with an automated teller machine.

4. The method for detecting the transparent card as recited in claim 1, wherein the microprocessor processes the detection information to enable fabrication of the transparent card.

5. The method for detecting the transparent card as recited in claim 1, wherein the processing of the transparent card comprises reading a magnetic stripe on the transparent card.

6. The method for detecting the transparent card as recited in claim 1, wherein the processing of the transparent card comprises attaching the card to a card carrier.

7. The method for detecting the transparent card as recited in claim 1, wherein the microprocessor uses the detection information to record the detection of the transparent card.

8. The method for detecting the transparent card as recited in claim 1, wherein the transparent card is one of a credit card, a bank card, an ATM card, a telephone card, a gift card, and a stored value card.

9. The method for detecting the transparent card as recited in claim 1 wherein the reflectance sensor and a planar face of the transparent card are separated by a distance of about 5 mm.

10. A method for detecting a transparent card, comprising:
- pointing a light emitting source at a detection area, wherein a light beam emitted by the light emitting source passes through the detection area;
- moving the transparent card into the detection area;
- using a detector to detect a portion of the light beam reflected from the transparent card; and
- receiving detection information from the detector at a microprocessor;
- wherein the microprocessor uses the detection information to enable processing of the transparent card, and wherein the processing of the transparent card comprises associating the transparent card with an insert and inserting the transparent card and insert into an envelope.

11. The method for detecting the transparent card recited in claim 10, wherein the light emitting source is an infrared emitting diode.

12. The method for detecting the transparent card recited in claim 10, wherein the detector is a phototransistor.

13. The method for detecting the transparent card recited in claim 10, wherein a conveyor belt is used to move the transparent card into the detection area.

14. The method for detecting the transparent card recited in claim 10, wherein the light emitting source emits a collimated light beam.

15. The method for detecting the transparent card recited in claim 10, wherein the light emitting source emits a convergent light beam.

16. The method for detecting the transparent card as recited in claim 10, wherein the microprocessor processes the detection information to enable fabrication of the transparent card.

17. The method for detecting the transparent card as recited in claim 10, wherein the processing of the transparent card comprises reading a magnetic stripe on the transparent card.

18. The method for detecting the transparent card as recited in claim 10, wherein the microprocessor uses the detection information to record the detection of the transparent card.

19. A transparent card detection system, comprising:
- a sensor system, wherein the sensor system comprises an emitter that emits a light beam pattern and a detector configured to detect a portion of the light beam pattern reflected from the transparent card when it is in a detection area within the light beam pattern;
- a conveyor for moving the transparent card into the detection area;
- a microprocessor that is configured to receive detection information from the sensor system at a microprocessor; and
- an envelope inserter associated with the microprocessor for inserting the transparent card into an envelope, wherein the microprocessor processes the detection information and activates the envelope inserter to insert the transparent card into the envelope.

20. The transparent card detection system as recited in claim 19, wherein the sensor system is positioned about 5 mm from the detection area.

21. The transparent card detection system recited as recited in claim 19, wherein the microprocessor processes the detection information to enable fabrication of the transparent card.

22. The transparent card detection system as recited in claim 19, further comprising:

an embosser associated with the microprocessor for embossing the transparent card, wherein the microprocessor processes the detection information and activates the embosser to emboss the transparent card.

23. The transparent card detection system as recited in claim 19, further comprising:

a magnetic stripe applicator associated with the microprocessor for applying a magnetic stripe to the transparent card, wherein the microprocessor processes the detection information and activates the magnetic stripe applicator to apply a magnetic stripe to the transparent card.

24. The transparent card detection system as recited in claim 19, wherein a card insert is inserted with the card into the envelope.

25. The transparent card detection system as recited in claim 19, wherein the microprocessor uses the detection information to enable processing of the transparent card.

26. The transparent card detection system as recited in claim 19, further comprising:

a magnetic stripe reader associated with the microprocessor, wherein the microprocessor processes the detection information and activates the magnetic stripe reader to read a magnetic stripe on the transparent card.

27. The transparent card detection system as recited in claim 19, wherein the microprocessor is configured to use the detection information to record the detection of the transparent card.

28. A transparent card detection system, comprising:

means for emitting a light beam disposed opposite to a planar face of the transparent card and positioned so that the light beam emitted from the emitting means is incident upon the planar face of the transparent card;

means for detecting a light beam disposed appurtenant to the means for emitting and opposite to the planar face of the transparent card so that a portion of the light beam reflected from the planar face of the transparent card falls upon the means for detecting; and a microprocessor that is configured to receive detection information from the sensor system at a microprocessor;

wherein the microprocessor uses the detection information to enable processing of the transparent card, and wherein processing of the transparent card comprises inserting the transparent card into an envelope.

29. The transparent card detection system recited in claim 28, wherein:

the means for emitting is positioned so that an angle of incidence of the light beam relative to the planar face of the transparent card is greater than about forty five degrees.

30. The transparent card detection system recited in claim 28, wherein the means for emitting emits infrared radiation and the means for detecting detects infrared radiation.

31. The transparent card detection system recited as recited in claim 28, wherein the microprocessor processes the detection information to enable fabrication of the transparent card.

32. The transparent card detection system as recited in claim 28, further comprising:

an embosser associated with the microprocessor for embossing the transparent card, wherein the microprocessor processes the detection information and activates the embosser to emboss the transparent card.

33. The transparent card detection system as recited in claim 28, further comprising:

a magnetic stripe applicator associated with the microprocessor for applying a magnetic stripe to the transparent card, wherein the microprocessor processes the detection information and activates the magnetic stripe applicator to apply a magnetic stripe to the transparent card.

34. The transparent card detection system as recited in claim 28, further comprising:

a magnetic stripe reader associated with the microprocessor, wherein the microprocessor processes the detection information and activates the magnetic stripe reader to read a magnetic stripe on the transparent card.

35. A card detection system, comprising:

means for emitting a light beam disposed opposite to a target area and positioned so that the light beam emitted from said means for emitting passes through the target area;

means for moving the transparent card into the target area;

means for detecting the light beam, wherein the means for detecting is positioned appurtenant to the means for emitting and opposite to the target area, and wherein a reflected portion of the light beam from the transparent card is reflected from the transparent card onto the means for detecting when the transparent card is located in the target area; and a microprocessor that is configured to receive detection information from the sensor system at a microprocessor;

wherein the microprocessor uses the detection information to enable processing of the transparent card, and wherein processing of the transparent card comprises inserting the transparent card into an envelope.

36. The transparent card detection system recited in claim 35, wherein the means for emitting emits infrared radiation and the means for detecting detects infrared radiation.

37. The transparent card detection system recited in claim 35, wherein the means for positioning is a conveyor belt.

* * * * *